United States Patent [19]
Eckert

[11] 3,945,238
[45] Mar. 23, 1976

[54] CLIP DISPENSER AND APPLICATOR

[76] Inventor: Robert L. Eckert, 11231 Foster Road, Los Alamitos, Calif. 90720

[22] Filed: Oct. 24, 1974

[21] Appl. No.: 517,516

[52] U.S. Cl. .............. 72/410; 29/212 D; 29/243.56
[51] Int. Cl.² ......................................... B21D 9/08
[58] Field of Search..................... 72/407, 409, 410; 29/203 H, 203 HC, 203 HM, 243.56, 211 D, 212 D; 227/19, 48

[56] References Cited
UNITED STATES PATENTS

| | | | |
|---|---|---|---|
| 2,605,467 | 8/1952 | Lind et al. | 72/410 |
| 2,656,539 | 10/1953 | Chilton | 72/407 |
| 2,923,008 | 2/1960 | Ingram | 29/243.56 |
| 2,929,069 | 3/1960 | Christin | 29/212 D |
| 3,026,520 | 3/1962 | Albrecht | 72/407 |
| 3,064,263 | 11/1962 | Powers | 72/410 |
| 3,628,230 | 12/1971 | Grise | 29/212 D |

Primary Examiner—Lowell A. Larson
Attorney, Agent, or Firm—Fulwider, Patton, Rieber, Lee & Utecht

[57] ABSTRACT

There is disclosed a dispenser and applicator tool for the dispensing and fastening of clips such as hog rings and the like to work elements. The applicator mechanism of the tool has pivotal jaw members for clinching the clip about the work element and an appropriate mechanism for effecting pivotal movement of these jaw members. The dispensing mechanism of the tool includes a removable magazine of clips aligned in a stacked, face-to-face array with a feeder mechanism to advance the clips to the tool. The feeder mechanism and pivotal jaw members are interconnected by a slide including a plate mounted for reciprocal movement on the tool body and effective to advance the magazine into clip dispensing alignment with the jaw members of the tool.

7 Claims, 12 Drawing Figures

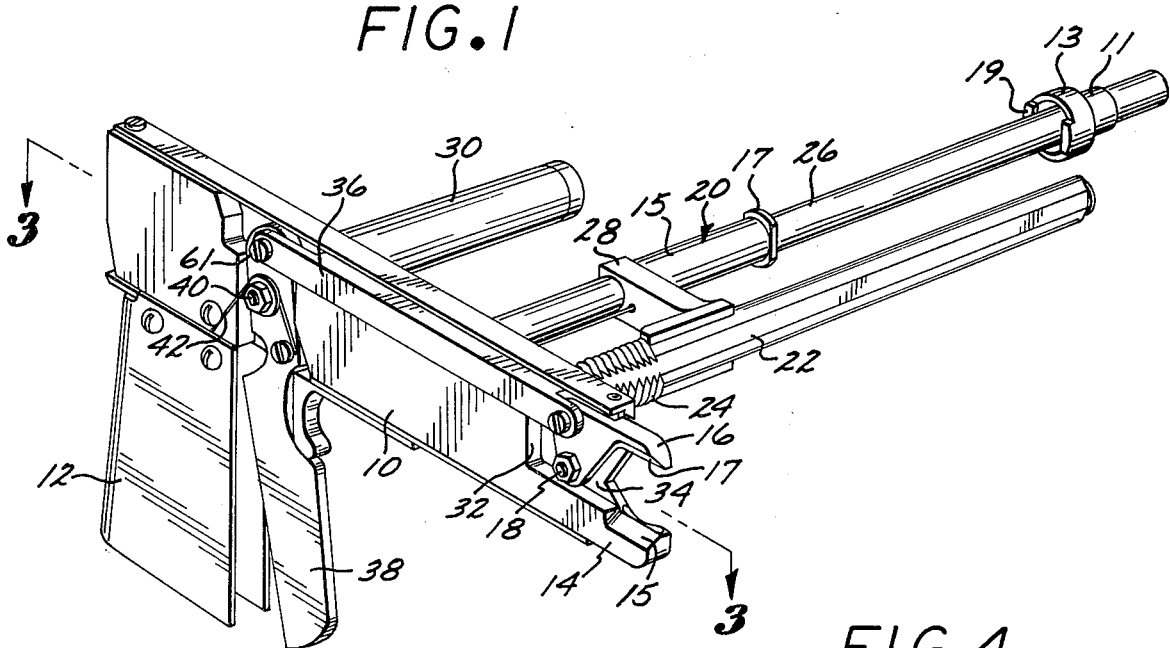
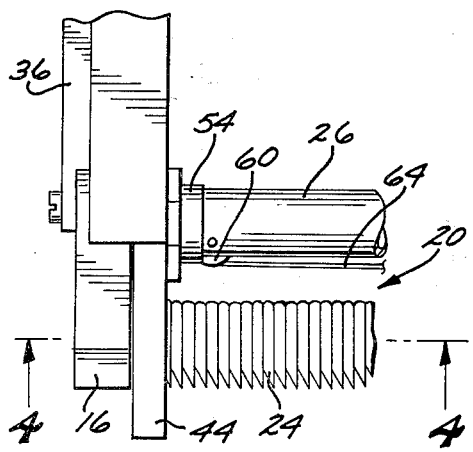
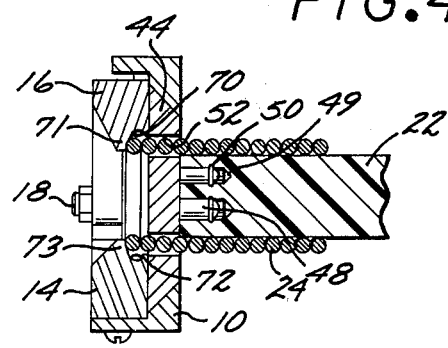
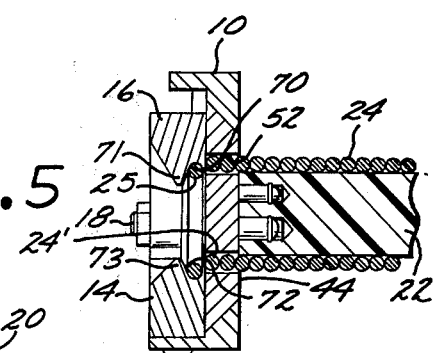
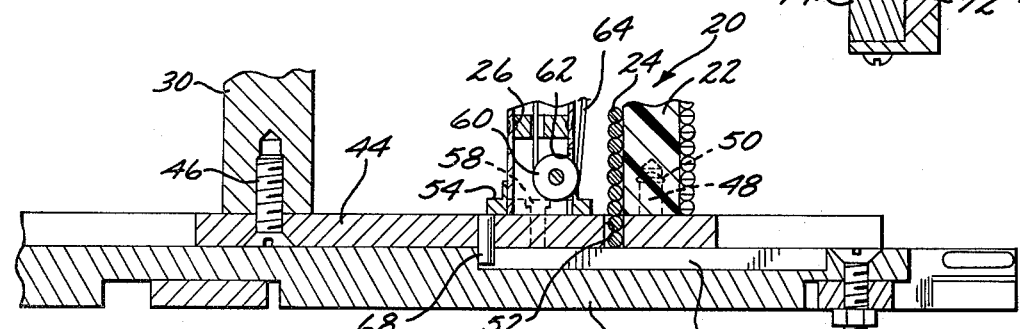

U.S. Patent March 23, 1976 Sheet 2 of 2 3,945,238
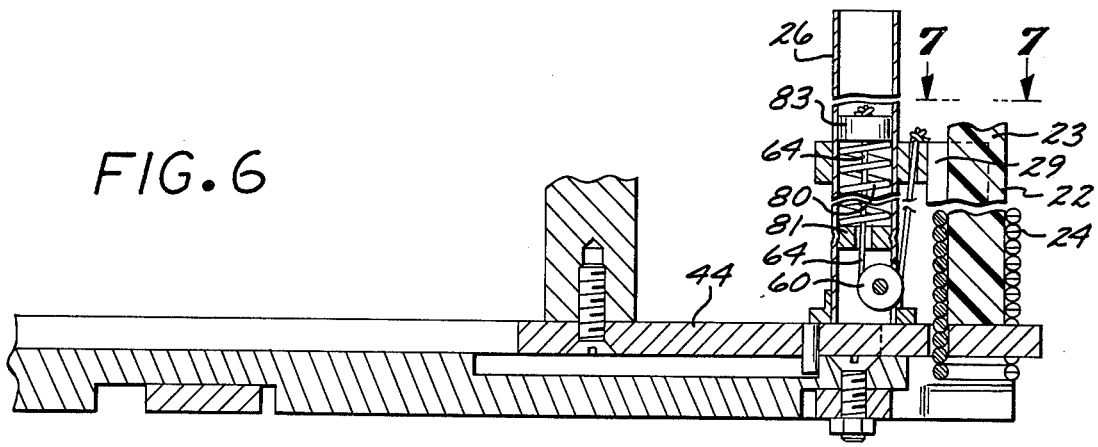
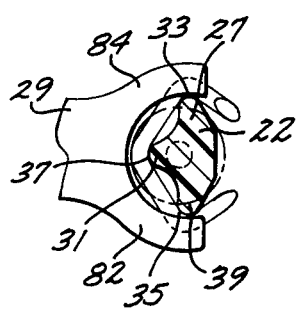
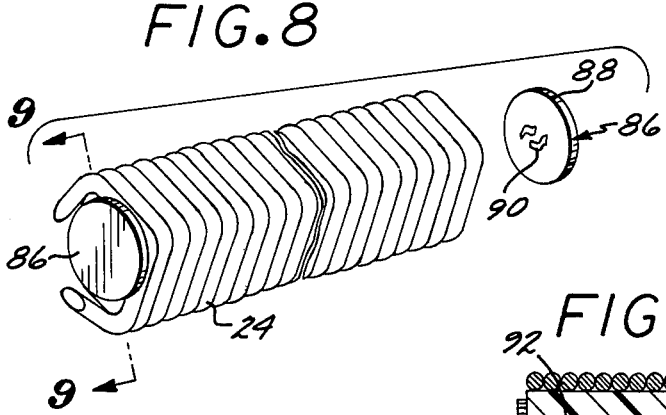
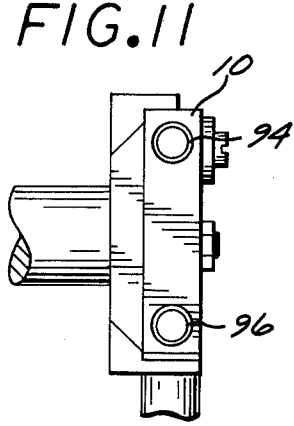
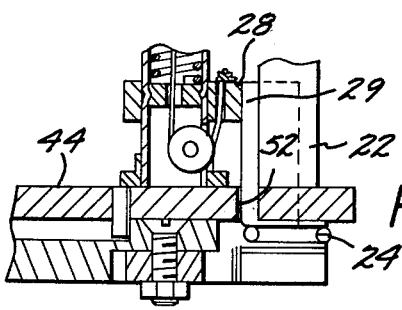
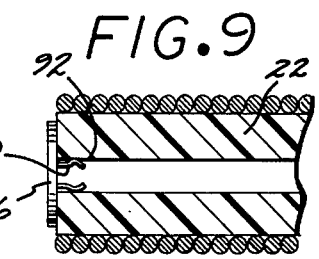
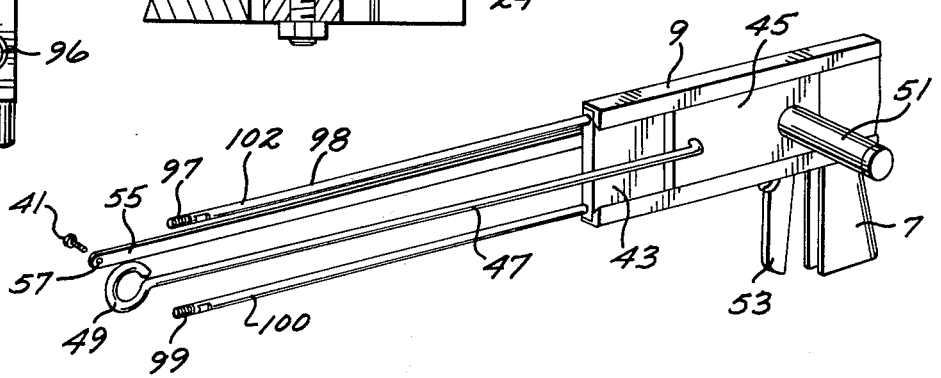

CLIP DISPENSER AND APPLICATOR

BACKGROUND OF THE INVENTION

1. Field of the Invention

This invention relates to a dispenser and applicator tool for the attachment of clip fasteners to work elements and, in particular, relates to a clip dispenser and applicator useful for the application of hog rings and the like to work elements.

2. Description of the Prior Art

A fastener which has wide acceptance is the ubiquous hog ring which is formed of metal wire in the shape of a diamond having one of its sides open to permit its placement about work elements. This clip fastener is employed in construction of fencing, auto upholstery, etc. Despite its widespread use, heretofore, there has been no simple, portable dispenser and applicator for the placement for the fasteners about work elements. A number of devices have been devised to feed the clips to the jaws of applicators such as described in U.S. Pat. Nos. 1,451,717; 2,487,475 and 2,678,443. The tools described in the aforementioned patents have the dispensing means permanently mounted on the tool in a fixed relationship to the pivotal jaws, and, in this construction, the dispensing means limits the accessability of the jaws to work elements. Some attempts have been made to provide a clip dispensing station at a location remote from the clip applicator station such as described in U.S. Pat. Nos. 3,160,890 and 3,287,955 where the jaws of the tools are mounted on slides to permit their retraction to a clip receiving position. These tools are relatively complex and do not have adequate mechanical advantage for manual actuation of the pivotal movement of the jaws and, accordingly, require power assist. Various other tools have been disclosed which have reciprocating slides which receive the clip and force it against the work elements such as those described in U.S. Pat. Nos. 2,699,594 and 3,653,117. An attempt is made in a recent patent, U.S. Pat. No. 3,064,263, to provide a manual tool for the application of hog rings and the like which has a magazine element that can be pivoted into a clip dispensing position and into a retracted position away from the jaws to permit placement of the clips about work elements. Rotation of the clip magazine in this manner can not be repeated at a rapid frequency and the extent of movement of the magazine is limited by this construction.

Accordingly, there remains the desirability of providing a simple clip dispenser and applicator tool useful with magazines of clips for the rapid application of C clips, hog rings and the like, to work elements. Desirably, such a tool should be provided for manual actuation.

BRIEF DESCRIPTION OF THE INVENTION

This invention comprises a tool for the dispensing and applying of C clips such as hog rings and the like in a rapid fashion without need for power assistance. The tool includes first and second jaw members in pivotal connection to receive and crimp C clips about a work element with lever means mechanically linked thereto for effecting relative pivotal movement of the jaw members. The tool includes clip dispensing means including a clip supply means in the form of a magazine of a plurality of clips in a stacked, face-to-face array with resilient means biasing the array of clips towards the tool. The clip supply means is mounted on a slide including a plate reciprocally carried on the tool and mounted for sliding movement between a clip dispensing position, with said magazine in juxtaposition to said jaws to deliver a clip thereto, and a retracted position, freeing said jaws for access to the work elements.

The tool is preferably adapted for manual actuation and has a pistol grip with a juxtapositioned hand lever mechanically linked to the jaw members for effecting their pivotal movement. A handle is also provided on the reciprocal plate of the clip dispensing means to permit the operator to manually advance and retract the clip dispensing means.

The pivotal jaws of the applicator have clip retaining grooves along opposed portions. The retaining grooves have arcuate, vertical walls and beveled lower lands for engagement of the clip with the jaws in their open position. The beveled lands are operative upon initial closing of the jaw members, to urge the stacked array of clip dispensers away from the jaw members, releasing the dispensing means and permitting its free retraction from the jaw members.

The invention also includes a magazine of clips in a stacked, face-to-face array about a mandrel which is provided as a substantially flat rod having opposite, rounded edges to engage opposite, inner apexes of the clips and with one central and coextensive rib along a flat surface thereof to engage the other, inner apex of the clip. The magazine includes removable buttons at opposite ends thereof with means permitting their removable attachment to the mandrel and with sufficient lateral dimensions to overlie the clips on the mandrel whereby the clips can be secured against dislodgement from the mandrel.

BRIEF DESCRIPTION OF THE DRAWINGS

The invention will be described by reference to the drawings of which:

FIG. 1 is a perspective view of the tool;
FIG. 2 is a view along lines 2—2 of FIG. 1;
FIG. 3 illustrates the dispensing means positioned in the clip dispensing position;
FIG. 4 is a view along lines 4—4 of FIG. 3;
FIG. 5 is a view also along lines 4—4 of FIG. 3 showing the initial displacement of the pivotal jaws;
FIG. 6 is a longitudinal cross-section view of the tool with the clip dispensing means in the dispensing position;
FIG. 7 is a view along line 7—7 of FIG. 6;
FIG. 8 is a perspective view of the magazine of clip fasteners;
FIG. 9 is a view along lines 9—9 of FIG. 8;
FIG. 10 illustrates the advance mechanism of the clip dispensing means;
FIG. 11 is an end view of the tool body; and
FIG. 12 illustrates an extension accessory for attachment to the tool.

DESCRIPTION OF THE PREFERRED EMBODIMENTS

The dispenser and applicator tool of the invention is shown in FIG. 1 as formed with a main body 10, rearwardly mounted pistol grip 12 and a forward pair of jaw members 14 and 16 which are pivotally connected by pivot means in the form of a bolt fastener 18. The tool also carries clip dissensing means 20 including removable magazine 22 of clip 24 with a feeder means therefor including a coextensive tubular guide member 26 with ram means 28 slidably mounted thereon and resiliently biased towards the tool body 10. Clip dispensing means 20 is mounted as an assembly on a plate, not shown in FIG. 1, carried by tool body 10 for reciprocal movement thereon. The plate also carries hand grip 30 to permit the operator to effect reciprocal movement of the clip dispensing means 20.

The jaw members 14 and 16 are shown with jaw member 14 as an extension of body 10, grooved at 32 to provide an inset surface 34 for the pivotal mounting of the movable jaw member 16. The edges of these jaws can be champered as shown at 15 and 17 to provide maximum accessibility to the work element.

The preferred construction of the tool is for manual actuation of the pivotal jaw 16. To this end, jaw 16 is connected by link member 36 to a hand lever 38 carried at an intermediate position of the tool, immediately forward of pistol grip 12. Lever 38 is pivotally mounted on body 10 by pin means 40 in the form of a machine screw and the like. Suitable resilient means such as spring 42 can be provided for biasing lever 38 into the outward position, biasing jaws 16 and 14 open, as shown.

A longitudinal cross sectional view of the tool is shown in FIG. 2 where the tool body 10 can be seen to have a slide 42 in the form of a longitudinal groove in which plate 44 is mounted for reciprocal movement. Plate 44 as previously mentioned, carries handle 30, attached thereto by suitable means such as screw fastener 46 that engages a threaded tap in the handle 30. The forward end of plate 44 carries the clip dispensing means 20 in the form of a magazine 22 removably mounted on plate 44 by attachment means such as indexing detent means in the form of one or more pins 48 bearing annular shoulders 50 which engage in mating peripheral grooves in the bores 49 in the end of the mandrel of magazine 22. Plate 44 bears a generally C-shaped slot 52 directly beneath the mandrel for receiving and permitting through passage of the clips 24.

The remaining member of the clip dispensing means 20 comprises the tubular guide member 26 which is secured to plate 44 by ring member 54 and screw 58. The lower end of this tubular member 26 bears pulley 60 rotatably mounted thereon and has a wall slot 62 for receiving cord 64 that passes about pulley 60 and into tubular member 26 where it is connected to resilient means described hereinafter. In the preferred embodiment, means are provided to lock ram 28 in its most outboard position and out of alignment with the magazine 22. This is shown as sleeve 11 secured on tubular guide 26 and bearing an enlarged diameter sleeve 13. The outboard end of sleeve 15 of ram 28 bears a washer 17 which can have opposite flat edges, as shown. This washer is of sufficient diameter to enter sleeve 13. The latter bears retaining means such as ears 19 which engage the washer 17 when the latter is inserted into sleeve 13 and rotated 90 degrees.

Body 10 also bears slot 66 that extends longitudinally along a portion of main slot 42. Plate 44 carries stop means in the form of pin 68 which projects into slot 66 and serves to limit the forward and rearward reciprocal travel of plate 44 on body 10. The plate 44 can be secured to body 10 by any suitable means, e.g., slot 42 can be a dovetailed slot to retain the assembly of plate 44 on body 10.

The clip dispensing position of dispensing means 20 is illustrated in FIG. 3. As shown in this view, the clip dispensng means 20 is in its most forward end of jaws 16 and 14 so that clips 24 are located in juxtaposition to the clip retaining groove carried by the jaw members. The alignment of the clips with the jaw members is better illustrated in the sectional view shown in FIG. 4. As there illustrated, the plate 44 can be seen in its dovetailed engagement with body 10 that carries the lower anvil jaw 14 and upper pivotal jaw 16 on pin 18. This view also shows the indexing and retaining means for the removable mounting of the mandrel of magazine 22 on plate 44 wherein the mandrel is shown to have a plurality of bores 49 which receive pins 48 carried by plate 44 and having annular shoulders 50 that engage in the detent, peripheral grooves of bores 49. The clips 24 carried in a stacked, face-to-face array on the mandrel are urged, by sliding ram 28, to advance through the C-shaped groove 52 of plate 44 and into the clip retaining groove means of the jaw members which are in the form of opposing grooves 70 and 72 on each of these jaw members. These grooves are formed with arcuate cross sections and with an inclined lands 71 and 73 for receiving the leading clip of the clips 24.

The inclined lands 71 and 73 are effective, upon initial movement of the jaw members, to effect displacement of the array of clip dispensers 24 outwardly, against the bias of the feeding mechanism, thereby releasing the dispensing means from its dispensing position and permitting its free retraction. FIG. 5 illustrates the initial movement of the jaw members with the resultant displacement of the clips 24. As there illustrated, jaw member 16 has been pivoted slightly into the closed position and the stiffness of the leading clip 25 of the stacked array of clips 24 is sufficient to urge the clip 25 along the inclined lands 71 and 73 of these jaw members, seating clip 25 securely in the arcuate side wall of the grooves 70 and 72. This movement of the clip along lands 71 and 73 effects an outward displacement of the stacked array of clips 24 on the mandrel so that the successive clip member 24' can be seen to have been displaced entirely into groove 52, thereby freeing plate 44 for reciprocal movement on body 10.

Referring now to FIG. 6, the feeding mechanism of the clip dispensing means 20 will be further described. FIG. 6 is a longitudinal view along the forward end of the tool showing plate 44 and dispensing means 20 in the forward, clip dispensing position. The tubular member 26 can be seen to support ram 28 which is slidably mounted thereon and which has a foot 29 that projects about mandrel 23 with its under surface bearing against the outboard clip of the stacked array of the clip fasteners 24. The ram 28 is biased to move towards the body of the tool by resilient means in the form of a compression spring 80 having its lower end resting on stop ring 81 and its upper end biased against travelling slider 83. The flexible cord 64 passes about pulley 60 and through a bore in slider 83 and is attached to slider 83 by a knot.

The constructional features of the magazines of clip dispensers are illustrated in FIGS. 7–9. As shown in FIG. 7, the magazine 22 comprises a mandrel 23 in the form of a generally flat rod having opposite, rounded edges 27 and 39 and a central, coextensive rib 31. The clip dispensers as shown are generally C-shaped or, more precisely, generally diamond shaped with one open side to permit their placement over the work element. These clips, therefore, have opposite inner apexes 33, 35 and 37 for receiving the rounded shoulders 27, 39 and 31, respectively, of mandrel 23 whereby the clips are retained on mandrel 23 and restrained thereon against rotational movement. FIG. 7 illustrates the foot 29 of ram means 28 as generally comprising a bifrucated member with opposite legs 82 and 84 which surround the opposite edges of mandrel 23 and bear against the clips 24 mounted thereon.

The magazine of clips is also provided with end members, best illustrated in FIGS. 8 and 9. These end members 86 comprise a generally flat, circular plate 88 and attachment means such as clips 90 for their removable attachment to the mandrel. As shown in FIG. 9, the mandrel has a bore 92 to receive the inboard ends of clips 90 and thereby retain the closure members 86 on the mandrel 23. The bore 90 is positioned off center of the mandrel 22, preferably in rib 31, so that the circular plate 88 extends over the center apex of the clip means, thereby serving as stop means for restraining the clip fasteners 24 on mandrel 23.

FIG. 10 illustrates the dispensing means in the position for feeding the last clip fastener 24 from the mandrel 22. This last clip member 24 must be advanced through the slot 52 of plate 44 and into the clip receiving grooves of the jaw members. The inboard end of clip means 29 of ram 28 is, therefore, of slightly reduced cross sectional dimensions to permit its passage into the C-shaped groove 52 of plate 44, projecting therethrough to dispense the last clip into the clip retaining grooves of the jaw members as illustrated in FIG. 10.

In many applications, it may be desirable to provide extension means for the remote actuation of the tool. To this end, the tool is provided with accessory attachment means shown in FIG. 11. This view from the rear of the tool shows body 10 with longitudinal bores 94 and 96 which are tapped with internal threads. FIG. 12 illustrates the extension means that can be used in combination with the tool. The extension means has a body 9 with a slide means in the form of a dovetailed groove 43 in which is reciprocally mounted plate 45 having handle 51 carried thereon. Body 9 also supports hand grip means in the form of piston grip 7 and a forward lever 53 which is similar in construction to lever 38 previously described. Rods 98 and 100 project from the forward end of body 9. These rods are rotatably carried on body 9 and bear, at their forward ends, external thread means 97 and 99 for engagement with the internal threads of bores 94 and 96. Wrench flats 102 can be provided on each of these rods to permit their engagement in the threaded bores 94 and 96. The reciprocally mounted plate 45 also supports, from its forward end, rod 47 that bears, at its forward end, eyelet means 49 which is of sufficient diameter to fit over handle 30 of the plate 44 to effect reciprocal movement of this plate upon movement of plate 45. The hand lever 53 is pivotally attached to the elongated link member 55 which has an aperture 57 in its forward end for receiving a machine screw such as 41 which replaces machine screw 61 (see FIG. 1) carried at the end of link member 36 whereby link 55 can be secured to link 36 for effecting pivotal movement of jaw 16.

The invention has been described with reference to the illustrated and presently preferred embodiment thereof. It is not intended that the invention be unduly limited by this disclosure of presently preferred embodiments. Instead, the invention is intended to be defined by the means, and their obvious equivalents, set forth in the following claims.

What is claimed is:

1. A tool for applying clips such as hog rings and the like about a work element comprising:
   a tool body;
   first and second jaw members in fixed pivotal connection on said tool body to receive and crimp said clips about said work element;
   lever means mechanically linked thereto and carried on said tool body for effecting relative pivotal movement of said jaw members;
   clip supply means including magazine means supporting a plurality of said clips in a stacked face-to-face array and resilient means biasing said array of clips toward said tool;
   reciprocable slide means including a plate slidably carried on said tool body and supporting said clip supply means whereby said supply means can be moved into a clip dispensing position adjacent said jaw members to deliver a clip to said jaw members and moved into a spaced apart position to permit application of said clip to said work element; and
   clip retaining groove means extending along opposite portions of said jaw members to receive a clip from said supply means.

2. The tool of claim 1 wherein said clip retaining groove means have arcuate vertical walls and beveled lower lands to urge, upon initial pivotal movement of said jaws, a retained clip upwardly against the resilient bias on said stacked array and release said supply means and permit reciprocation of said slide means.

3. The tool of claim 2 wherein said plate carries a handle at its rear to permit an operator to effect its reciprocation.

4. The tool of claim 2 wherein said magazine means is removably mounted on said plate and including ram means slidably mounted on said magazine and resiliently biased to advance said clips toward said tool.

5. The tool of claim 4 wherein said plate carries a tubular guide member in juxtaposition to said magazine means with ram means slidably mounted thereon and bearing a foot projection surmounting said magazine means.

6. The tool of claim 5 wherein said tubular guide member carries resilient means urging said ram member toward said tool.

7. The tool of claim 6 wherein the outboard end of said tubular guide member bears retaining means for releasably retaining said ram member in a retracted position against the force of said resilient means.

* * * * *